US008576851B2

(12) United States Patent
Elumalai et al.

(10) Patent No.: US 8,576,851 B2
(45) Date of Patent: Nov. 5, 2013

(54) INTEGRATING DATA WITH CONVERSATIONS

(75) Inventors: Arulkumar Elumalai, Seattle, WA (US); Craig M. Combel, Issaquah, WA (US); Amritansh Raghav, Seattle, WA (US); Rajesh Ramanathan, Redmond, WA (US); Eran Shtiegman, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 751 days.

(21) Appl. No.: 11/534,630

(22) Filed: Sep. 22, 2006

(65) Prior Publication Data

US 2008/0075074 A1 Mar. 27, 2008

(51) Int. Cl.
*H04L 12/28* (2006.01)
(52) U.S. Cl.
USPC .................. 370/395.2; 370/352; 709/227
(58) Field of Classification Search
USPC ........ 370/260, 352, 389, 395.2; 709/207, 227
See application file for complete search history.

(56) References Cited

U.S. PATENT DOCUMENTS

| | | | |
|---|---|---|---|
| 6,212,548 B1 | 4/2001 | DeSimone et al. | |
| 6,496,851 B1 | 12/2002 | Morris et al. | |
| 6,697,840 B1 | 2/2004 | Godefroid et al. | |
| 6,816,579 B2 | 11/2004 | Donovan et al. | |
| 6,865,681 B2 | 3/2005 | Nuutinen | |
| 6,870,848 B1 | 3/2005 | Prokop | |
| 6,879,994 B1 | 4/2005 | Matsliach et al. | |
| 6,931,114 B1 | 8/2005 | Martin | |
| 7,240,093 B1 | 7/2007 | Danieli et al. | |
| 7,508,814 B1 * | 3/2009 | Barzegar et al. | 370/352 |
| 7,558,267 B2 | 7/2009 | Ionescu | |
| 2002/0073154 A1 * | 6/2002 | Murakami et al. | 709/205 |
| 2002/0095465 A1 | 7/2002 | Banks et al. | |
| 2002/0163538 A1 | 11/2002 | Shteyn | |

(Continued)

FOREIGN PATENT DOCUMENTS

| | | |
|---|---|---|
| KR | 10-2005-0079882 | 8/2005 |
| KR | 10-2006-0051816 | 5/2006 |
| WO | WO-2008/036510 A1 | 3/2008 |

OTHER PUBLICATIONS

Dalgic, Ismail and Hanlin Fang, "Comparison of H.323 and SIP for IP Telephony Signaling," Proc. of Photonics East, Boston, Mass., Sep. 20-22, 1999.

(Continued)

*Primary Examiner* — Phirin Sam
*Assistant Examiner* — Mounir Moutaouakil
(74) *Attorney, Agent, or Firm* — Perkins Coie LLP

(57) ABSTRACT

A facility for integrating data in conversations is provided. In various embodiments, the facility sends a first message to a responding computing device to begin a conversation, receives a second message associated with the conversation from the responding computing device, determines whether the received message contains an indication of data that is to be associated with the conversation and, when the received message contains an indication of data that is to be associated with the conversation, renders the data. The facility can comprise an application server that receives from an initiator a first message associated with a conversation and responds to received messages, a conversation component that handles messages associated with the conversation, and an integration component that determines whether there is data that is to be associated with the conversation and, if so, adds an indication of the data to a second message that it sends to the initiator.

5 Claims, 12 Drawing Sheets

(56) References Cited

U.S. PATENT DOCUMENTS

| | | |
|---|---|---|
| 2003/0023508 A1 | 1/2003 | Deep |
| 2003/0051037 A1 | 3/2003 | Sundaram et al. |
| 2003/0145054 A1 | 7/2003 | Dyke |
| 2003/0231626 A1 | 12/2003 | Chuah et al. |
| 2004/0024879 A1 | 2/2004 | Dingman et al. |
| 2004/0030783 A1 | 2/2004 | Hwang |
| 2004/0073643 A1 | 4/2004 | Hayes et al. |
| 2004/0187109 A1 | 9/2004 | Ross et al. |
| 2004/0202303 A1 | 10/2004 | Costa-Requena et al. |
| 2004/0215787 A1 | 10/2004 | Gibson et al. |
| 2004/0230991 A1* | 11/2004 | Blackketter et al. ............ 725/31 |
| 2004/0249949 A1 | 12/2004 | Gourraud et al. |
| 2004/0258238 A1 | 12/2004 | Wong |
| 2004/0260781 A1 | 12/2004 | Shostack et al. |
| 2004/0260819 A1 | 12/2004 | Trossen |
| 2004/0264437 A1 | 12/2004 | Luken |
| 2005/0041603 A1* | 2/2005 | Tighe et al. ................... 370/260 |
| 2005/0047389 A1 | 3/2005 | Bond et al. |
| 2005/0060368 A1 | 3/2005 | Wang et al. |
| 2005/0114514 A1 | 5/2005 | Bostrom et al. |
| 2005/0132412 A1 | 6/2005 | Richardson et al. |
| 2005/0213580 A1 | 9/2005 | Mayer et al. |
| 2005/0249196 A1 | 11/2005 | Ansari et al. |
| 2006/0026288 A1 | 2/2006 | Acharya et al. |
| 2006/0067507 A1* | 3/2006 | Erhart et al. ............ 379/265.12 |
| 2006/0072523 A1 | 4/2006 | Richardson et al. |
| 2006/0075039 A1 | 4/2006 | Narayanaswami et al. |
| 2006/0092895 A1 | 5/2006 | Kim et al. |
| 2006/0182084 A1* | 8/2006 | Ionescu ........... 370/352 |
| 2006/0239253 A1 | 10/2006 | Gallant et al. |
| 2006/0276193 A1 | 12/2006 | Itzkovitz et al. |
| 2007/0014413 A1* | 1/2007 | Oliveira et al. ............... 380/278 |
| 2007/0037599 A1* | 2/2007 | Tillet et al. ................... 455/521 |
| 2007/0217394 A1 | 9/2007 | Greene et al. |
| 2007/0254605 A1 | 11/2007 | Zhao et al. |
| 2008/0170680 A1 | 7/2008 | Gibson |
| 2010/0138545 A1* | 6/2010 | Mela et al. .................... 709/227 |
| 2011/0029898 A1* | 2/2011 | Malik ........................... 715/758 |

OTHER PUBLICATIONS

Montes, Hector et al., "Deployment of IP Multimedia Streaming Services in Third-Generation Mobile Networks," IP Multimedia in Next Generation Mobile Networks: Services, Protocols, and Technologies, IEEE Wireless Communications, Oct. 2002, pp. 2-10, © 2002 IEEE.

Schulzrinne, Henning and Wedlund, Elin, "Application-Layer Mobility Using SIP," Mobile Computing and Communications Review, vol. 4, No. 3, Jul. 2001, pp. 47-57.

Wedlund, Elin and Henning Schulzrinne, "Mobility Support using SIP," WoWMoM'99, Seattle, Washington, pp. 76-82, © ACM 1999.

PCT International Search Report, US2007/077667, Applicant: Microsoft Corporation, mailing date: Jan. 8, 2008, 3 pages.

Campbell, B. et al., "Session Initiation Protocol (SIP) Extension for Instant Messaging," Request for Comments: 3428, Network Working Group, Standards Track, Dec. 2002, The Internet Society 2002, pp. 1-19.

European Patent Office Communication pursuant to Article 94(3) EPC, Application No. 06100164.0-1244, Applicant: Microsoft Corporation, Mar. 27, 2008.

European Patent Office Communication pursuant to Article 96(2) EPC, Application No. 06100164.0-1244, Applicant: Microsoft Corporation, Mar. 28, 2007.

European Search Report for European Patent Application No. 06100164.0, Applicant: Microsoft Corporation, Feb. 13, 2006.

Handley, M. and V. Jacobson, "SDP: Session Description Protocol," Request for Comments: 2327, Network Working Group, Standards Track, Apr. 1998, The Internet Society 2002, pp. 1-43.

Koskelainen / Schulzrinne, "Group Messaging in SIP," Jul. 13, 2001, Internet Draft, Internet Engineering Task Force, 10 pages.

Koskelainen, P., H. Schulzrinne and J. Ott, "Requirements for Floor Control," Internet Draft, Oct. 31, 2002, Internet Engineering Task Force, The Internet Society 2002, pp. 1-11.

Koskelainen, Petri, "Requirements for conference policy data," Internet Draft, Feb. 24, 2003, Internet Engineering Task Force, The Internet Society 2003, pp. 1-10.

Rosenberg, J. et al, "SIP: Session Initiation Protocol," Request for Comments: 3261, Network Working Group, Standards Track, Jun. 2002, The Internet Society 2002, pp. 1-269.

Schulzrinne / Rosenberg, "SIP Caller Preferences and Callee Capabilities," Internet Draft, Nov. 24, 2000, Internet Engineering Task Force, pp. 1-28.

* cited by examiner

US 8,576,851 B2

INTEGRATING DATA WITH CONVERSATIONS

BACKGROUND

Real-time conversations between conversation participants via their computing devices are becoming increasingly common. Such real-time conversations require that the participants be present at their computer devices (e.g., personal digital assistants, digital telephones, etc.) and able to respond when a communication is received. Common forms of real-time conversations are provided by instant messaging services, telephone systems, conferencing systems, and so on. An instant messaging service allows participants to send messages that other participants in the conversation receive quickly. The receiving participants can then send responsive messages to the other participants in a similar manner. To be effective, a real-time conversation relies on the participants' becoming aware of, reviewing, and responding to received messages quickly. This quick response is in contrast to conventional electronic mail systems in which the recipients of electronic mail messages respond to messages at their convenience.

Instant messaging services employ various networking protocols to establish and manage communications between participants. Some instant messaging services employ a "session initiation protocol" ("SIP"). SIP is an application-layer control protocol that computer systems can use to discover one another and to establish, modify, and terminate sessions. SIP is an Internet proposed standard. Its specification is available at the web site of the Internet Engineering Task Force, as are specifications for SIP extensions. These specifications are incorporated herein in their entirety by reference.

A SIP network comprises entities that can participate in a dialog as a client, server, both, or other entity. SIP supports multiple types of entities, including user agents, proxy servers, redirect servers, registrars, and routing agents. User agents initiate and terminate sessions by exchanging messages with other SIP entities. A user agent can be a user agent client ("UAC"), which is a device that initiates SIP requests, or a user agent server ("UAS"), which is a device that receives SIP requests and responds to such requests. As examples, "IP-telephones," personal digital assistants, and any other type of computing device may be user agents. A device can be a UAC in one dialog and a UAS in another, or may change roles during the dialog. A proxy server is an entity that acts as a server to clients and a client to servers. In so doing, proxy servers intercept, interpret, or forward messages between UACs and UASs. A redirect server accepts a SIP request and generates a response directing the UAC that sent the request to contact an alternate network resource. A registrar is a server that accepts registration information from user agents and informs a location service of the received registration information. A routing agent (e.g., a gateway) can connect entities across networks.

SIP supports multiple message types, including requests, which are sent from a UAC to a UAS, and responses, which are sent from a UAS to a UAC when responding to a request. A SIP message can be composed of three parts. The first part of a SIP message is a "request line," which includes fields to indicate a message (e.g., INVITE) and a request URI that identifies the user or service to which the request is being directed. The second part of a SIP message comprises headers whose values are represented as name-value pairs. The third part of a SIP message is the message's body, which is used to describe the session to be initiated or which contains data that relates to the session. Message bodies may appear in requests, responses, or other SIP messages.

A Voice over Internet Protocol ("VoIP") telephone call can be initiated by a caller's device sending a SIP INVITE request identifying the address (e.g., telephone number) of the callee to be called. When the callee's device receives the invitation, it can notify the callee of the invitation and send a SIP SESSION-In-PROGRESS message to the caller. When the callee answers, the callee's device responds to the INVITE request with a SIP 200 OK message. The conversation between the caller and callee can then be transmitted in packets using the Real-Time Protocol. When the caller hangs up, the caller's device sends a SIP BYE request to the callee to terminate the call.

Conventional interactive voice response ("IVR") systems cannot provide a lot of information to callers in a useful manner. As an example, IVR systems are generally unable to provide photographs, video, and so forth. People have become accustomed to receiving a lot of information, such as using multiple media forms. Conventional IVR systems are incapable of providing multimedia information because they only use telephones.

SUMMARY

A facility for integrating data in conversations is provided. The facility can operate on one or more computing devices to integrate data with conversations so that users can view additional data that may be associated with their online conversations. When an initiating computing device (e.g., a user's client computing device) sends a message to a responding computing device, such as an application server or other computing device that handles messages, the responding computing device can indicate in a message that it sends to the initiating computing device that additional data relating to the conversation is available. Upon receiving the message, the initiating computing device can then retrieve and render the indicated data, such as in a window associated with a communications application the user employs during the conversation. The data that the facility indicates in the message can identify any sort of information, such as web pages, audio/video content, documents, and so forth. The initiating computing device may identify the indication it received from the responding computing device in a message that it subsequently sends to the responding computing device, e.g., so that both computing devices can synchronize information.

This Summary is provided to introduce in a simplified form a selection of concepts that are further described below in the Detailed Description. This Summary is not intended to identify key features or essential features of the claimed subject matter, nor is it intended to be used as an aid in determining the scope of the claimed subject matter.

DETAILED DESCRIPTION

Figure 1A:
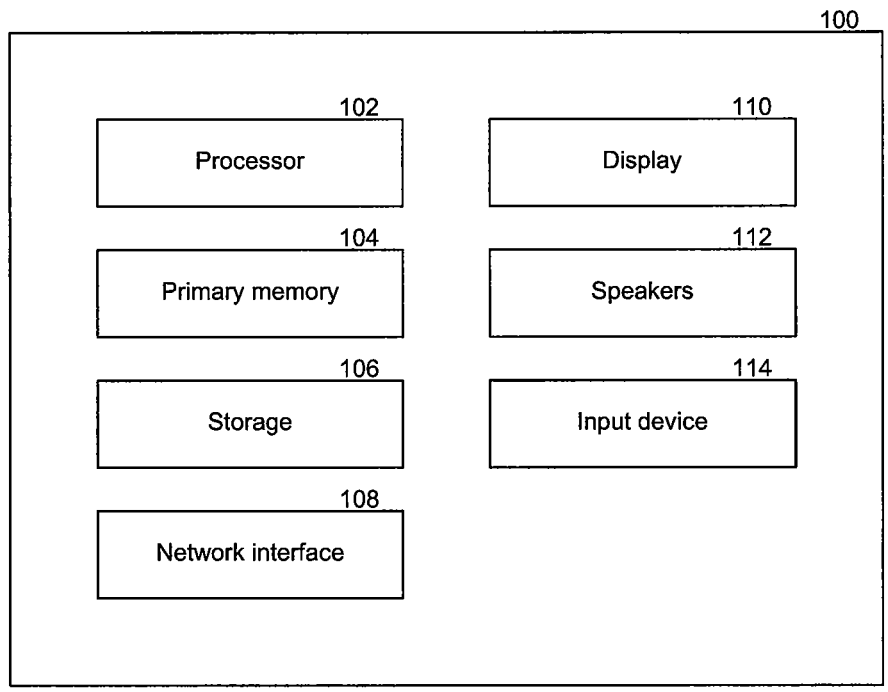
FIG. 1A is a block diagram illustrating an example of a suitable computing environment in which the facility may operate in some embodiments.

A facility for integrating data in conversations is provided. In various embodiments, the facility operates on one or more computing devices to integrate data with conversations so that users can view additional data that may be associated with their online conversations. As an example, the facility can integrate data with instant messaging, VoIP, or videoconference conversations so that users can view Internet web pages associated with the conversation. When an initiating computing device (e.g., a user's client computing device) sends a message to a responding computing device, such as an application server or other computing device that handles messages, the responding computing device can indicate in a message that it sends to the initiating computing device that additional data relating to the conversation is available. As an example, the responding computing device can identify a uniform resource locator ("URL") in a message that it sends to the initiating computing device. Upon receiving the message indicating the URL, the initiating computing device can then retrieve a web page located at the identified URL and display the retrieved web page, such as in a window associated with a communications application the user employs during the conversation. The data the facility indicates in the message can identify any sort of information, such as web pages, audio/video content, documents, and so forth. The initiating computing device may identify the indication it received from the responding computing device in a message that it subsequently sends to the responding computing device, e.g., so that both computing devices can synchronize information. As an example, the responding computing device may handle conversations with multiple initiating computing devices and when the initiating computing device provides an indication of data that the responding computing device previously identified, the responding computing device can employ the same data, such as to identify to an operator the web page the initiator is viewing.

By integrating data with conversations, the facility enables many scenarios that were previously difficult or impossible. As an example, a prospective purchaser of real estate can employ a communications application to connect to an application server associated with a real estate broker. The real estate broker can collect information from the prospective purchaser orally or via a web page that the application server indicated to the prospective purchaser's computing device. Then the real estate broker can orally describe potentially desirable properties to the prospective purchaser while the prospective purchaser views digital images relating to the potentially desirable properties that appear in a window associated with the communications application. To enable this to occur, the application server may send to the prospective purchaser's computing device one or more URLs that provide details associated with the potentially desirable properties, such as the digital images. Upon receiving the URLs, the communications application that the prospective purchaser employs retrieves and displays the web pages associated with the received URLs.

As another example, the facility can be used in an IVR environment that either needs to provide or collect information. The facility can enable the IVR environment to capture or provide much more information than conventional IVR environments are capable of. As an example, a user can employ a communications application to initiate a conversation with an IVR environment. Upon collecting keypresses (e.g., on a telephone or computing device) from the user, the IVR environment may send a message to the communications application indicating an application that the user's computing device is to begin executing. The application may provide information to the user or collect information from the user. The information can include complex files, such as audio, video, and so forth. Alternatively, the application can be an INTERNET EXPLORER that retrieves and displays web pages.

Thus, the facility integrates data with conversations to enable rich presentation of information and other interactions during conversations.

The facility is described in more detail in reference to the figures. FIG. 1A is a block diagram illustrating an example of a suitable computing environment 100 in which the facility may be implemented. A system for implementing the facility includes a general purpose computing device in the form of the computing system ("computer") 100. Components of the computer 100 may include, but are not limited to, a processing unit 102, a system primary memory 104, a storage unit 106, a network interface or adapter 108, a display 110, one or more speakers 112, and an input device 114.

The computer 100 typically includes a variety of computer-readable media that are operable with the storage unit 106. Computer-readable media can be any available media that can be accessed by the computer 100 and include both volatile and nonvolatile media and removable and nonremovable media.

The computer 100 may operate in a networked environment using logical connections to one or more remote computers. A remote computer may be a personal computer, a server, a router, a network PC, a peer device, or other common network node, and typically includes many or all of the elements described above in relation to the computer 100. A logical connection can be made via a local area network (LAN) or a wide area network (WAN), but may also be made via other networks. Such networking environments are commonplace in homes, offices, enterprisewide computer networks, intranets, and the Internet. The computer 100 can be connected to a network through the network interface 108, such as to a wired or wireless network.

The computer 100 is only one example of a suitable computing environment and is not intended to suggest any limitation as to the scope of use or functionality of the facility. Neither should the computing system environment be interpreted as having any dependency or requirement relating to any one or a combination of the illustrated components.

The facility is operational with numerous other general purpose or special purpose computing system environments or configurations. Examples of well-known computing systems, environments, and/or configurations that may be suitable for use with the facility include, but are not limited to, personal computers, server computers, handheld or laptop devices, cellular telephones, tablet devices, multiprocessor systems, microprocessor-based systems, set-top boxes, programmable consumer electronics, network PCs, minicomputers, mainframe computers, distributed computing environments that include any of the above systems or devices, and the like.

The facility may be described in the general context of computer-executable instructions, such as program modules, that are executed by a computer. Generally, program modules include routines, programs, objects, components, data structures, and so forth that perform particular tasks or implement particular abstract data types. The facility may also be employed in distributed computing environments where tasks are performed by remote processing devices that are linked through a communications network. In a distributed computing environment, program modules may be located in local and/or remote computer storage media, including memory storage devices.

Figure 1B:
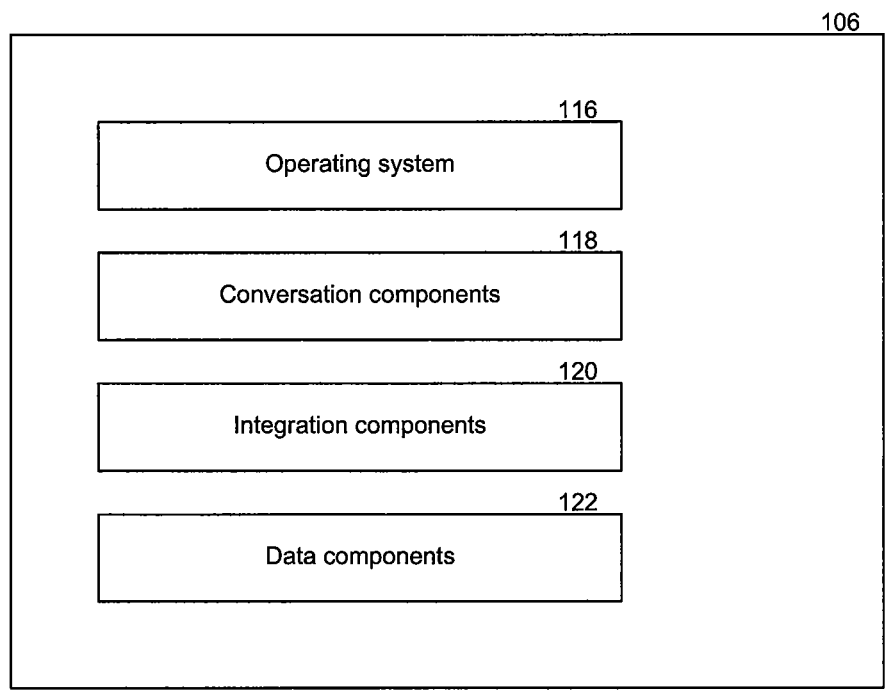
FIG. 1B is a block diagram illustrating a storage unit of FIG. 1A in further detail in some embodiments.

FIG. 1B is a block diagram illustrating a storage unit of FIG. 1A in further detail in some embodiments. According to the illustrated embodiment, the storage unit 106 stores an operating system 116, conversation components 118, integration components 120, and data components 122. Examples of operating systems include MICROSOFT WINDOWS, APPLE MACINTOSH, UNIX, LINUX, and others. Conversation components are components that provide conversation services. These include components associated with communications applications, device drivers that enable input and output, and so forth. Integration components are components that enable the facility to integrate conversation, data, and other components. As an example, an integration component may provide an application programming interface ("API") that adds an indication of data to conversation messages. Data components are components that enable the facility to manipulate data, such as by locating, identifying, retrieving, and rendering data. Examples of data components are Internet browsing controls, database access controls, and so forth.

While various functionalities and data are shown in FIGS. 1A and 1B as residing on particular computer systems that are arranged in a particular way, those skilled in the art will appreciate that such functionalities and data may be distributed in various other ways across computer systems in different arrangements. While computer systems configured as described above are typically used to support the operation of the facility, those skilled in the art will appreciate that the facility may be implemented using devices of various types and configurations, and having various components.

The techniques can be described in the general context of computer-executable instructions, such as program modules, executed by one or more computers or other devices. Generally, program modules include routines, programs, objects, components, data structures, etc., that perform particular tasks or implement particular abstract data types. Typically, the functionality of the program modules may be combined or distributed as desired in various embodiments.

The computing devices may function in association with other devices, such as telephones, video cameras, microphones, headsets, speakers, printers, and so forth. These are generally referred to as input or output devices. The computing devices may communicate with these or other devices using a physical or wireless connection, such as over intranets, the Internet, packet switched networks, and so forth.

Figure 2:
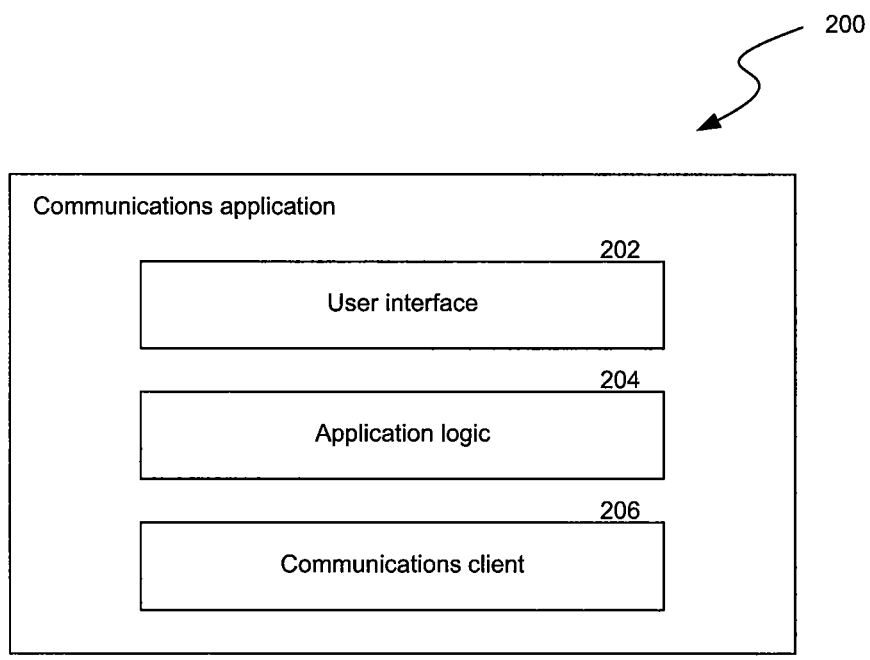
FIGS. 2-3 are block diagrams illustrating components associated with the facility in various embodiments.
Figure 3:
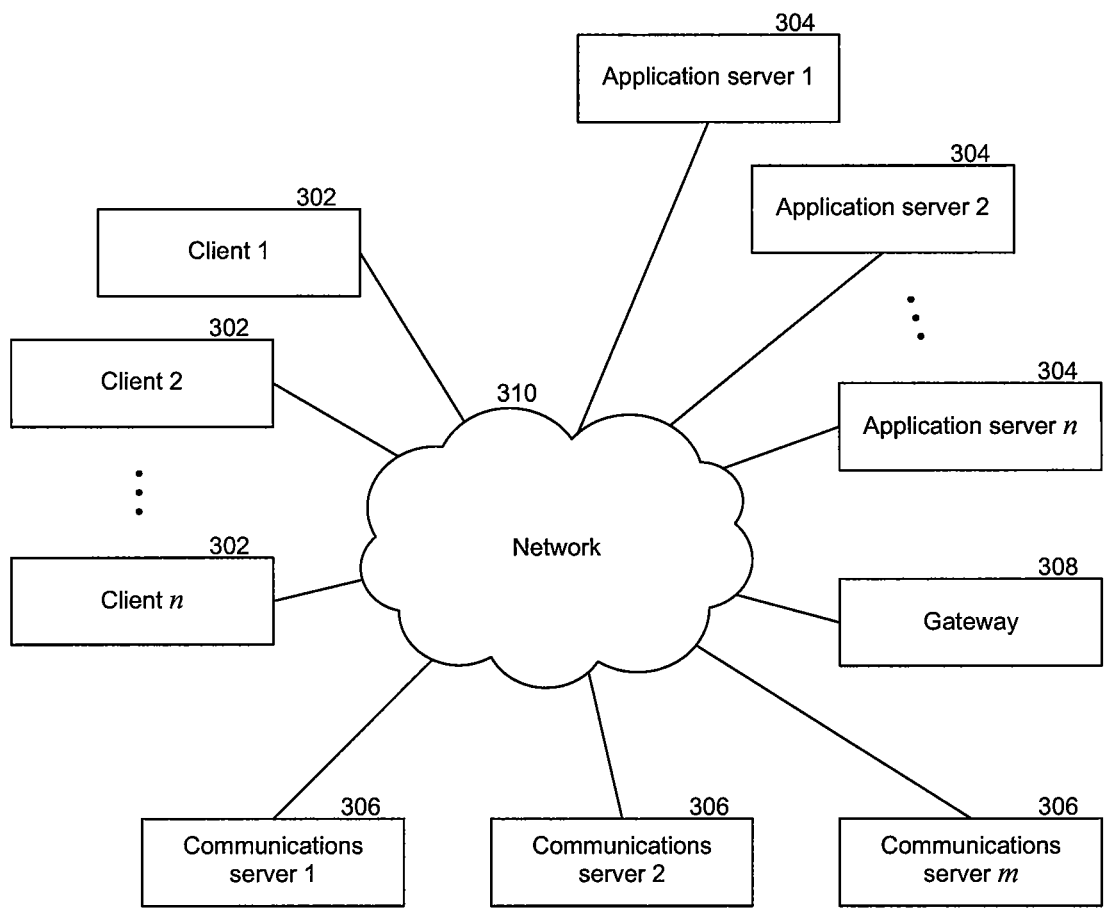

FIGS. 2-3 are block diagrams illustrating components associated with the facility in various embodiments. A communications application 200 can include a user interface component 202, application logic component 204, and communications client component 206.

The user interface component handles input and output operations. As examples, the user interface component can receive voice, video, text, and other input. The user interface component can also render audio, video, text, and other output. This component can work with the various components described above in relation to FIG. 1A to receive input and provide output, such as via device drivers associated with the components illustrated therein. The user interface component may provide an API that the application logic component, communications client component, or other components associated with the facility can employ, such as to control the communications application's user interface.

The application logic component may also provide an API that other components of the facility can employ. This component can provide logic that the facility uses to interpret information it receives, generate information to send to other participants in a conversation, and so forth. It may employ the user interface component's API, an API provided by the communications client component, and other components associated with the facility.

The communications client component handles data communications, such as by receiving and sending information using various networking and signaling protocols. As an example, it may receive and send SIP messages. Other components of the facility, such as the application logic component, may employ an API provided by the communications client component to send and receive messages. By doing so, the other components may not need to provide logic that is specific to the data communications protocols that the facility employs. As an example, the application logic component may invoke OpenConnection or SendMessage routines provided by the communications client component to open a connection with a participant and send a message. Then the communications client component can create and send one or more SIP messages to establish the connection and send the message.

The communications application may also employ the conversation components, integration components, and data components described above in relation to FIG. 1B.

According to the embodiment illustrated in FIG. 3, the facility includes one or more client computing devices 302, application server computing devices 304, communications server computing devices 306, gateway computing devices 308, and networks 310. The networks may also include one or more computing devices (not illustrated). These computing devices may be similar to the computing device illustrated above in relation to FIG. 1A.

A user (e.g., an "initiator") can employ a client computing device 302 to initiate a conversation or respond to a conversation request. This computing device may have one or more communications applications 200. As examples, the communications device may have one or more of a VoIP communications application, a video conferencing application, an application sharing application, and other communications applications, a real-time collaboration application (e.g., instant messaging), and so forth.

When an initiator initiates a conversation, the communications client may initially send messages to a communications server 306. The communications server can provide communications services to one or more client computing devices. The communications server may select and indicate to the client computing device one or more of the application servers that can respond to the message. As an example, the communications server may identify an address (e.g., Internet Protocol or IP address) of the selected application server. The client computing device can then send a message to the identified application server(s). Alternatively, the communications server may forward received messages to the selected application server(s).

An application server is a server that can respond to a message that the client sends. The application server may be able to retrieve information, such as from a database or other network resource, and provide the retrieved information in response to the message from the client. The application server may also employ other logic to calculate a response to the message.

The various computing devices can be interconnected via a network, such as an intranet, the Internet, or a combination of these networks. When communications occur over the Internet, the computing devices may employ a secured networking protocol, such as a secure version of the hypertext transport protocol (e.g., HTTPS).

Figure 4:
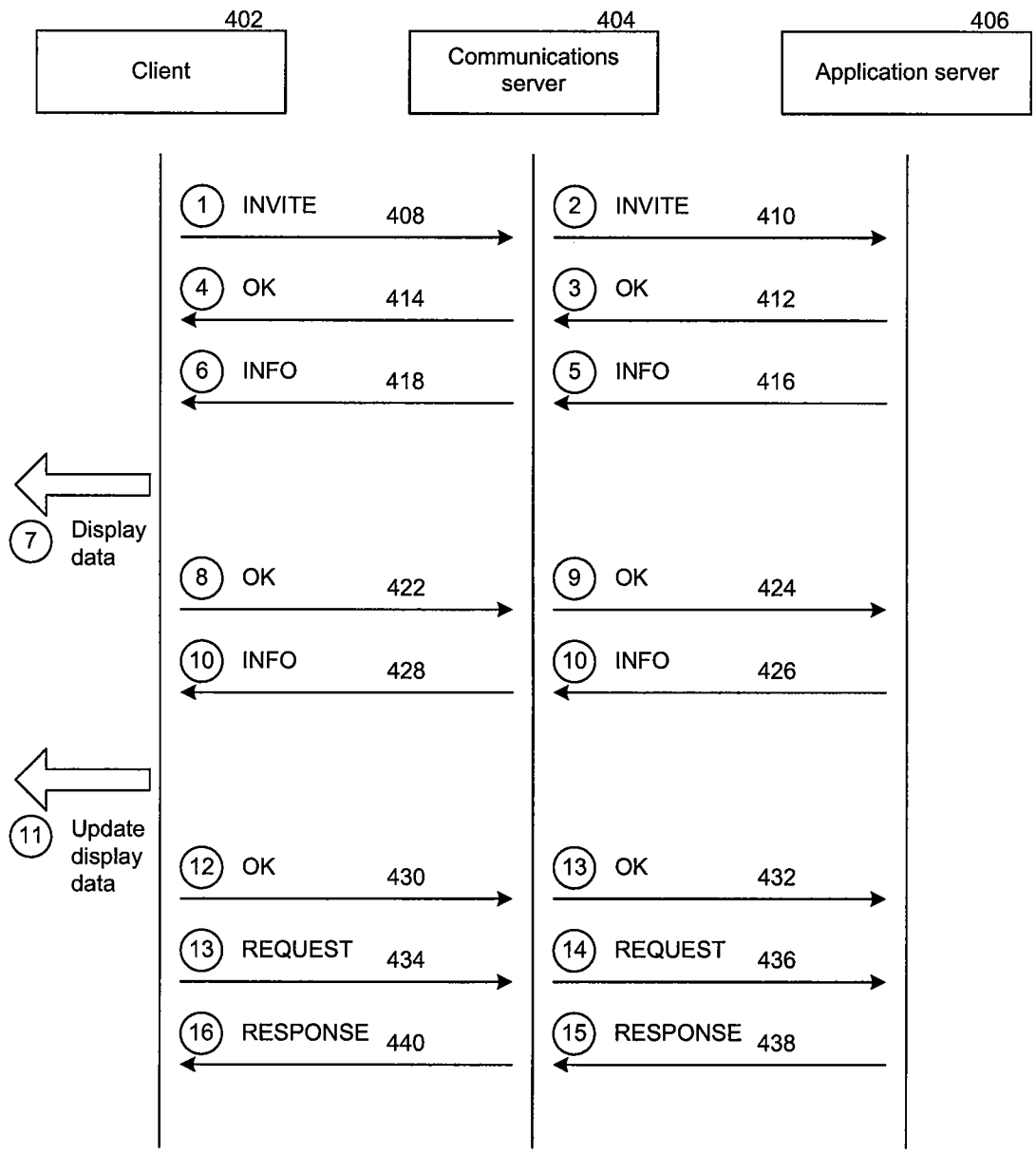
FIGS. 4-5 are message flow diagrams illustrating flows of messages between components of the facility in various embodiments.
Figure 5:
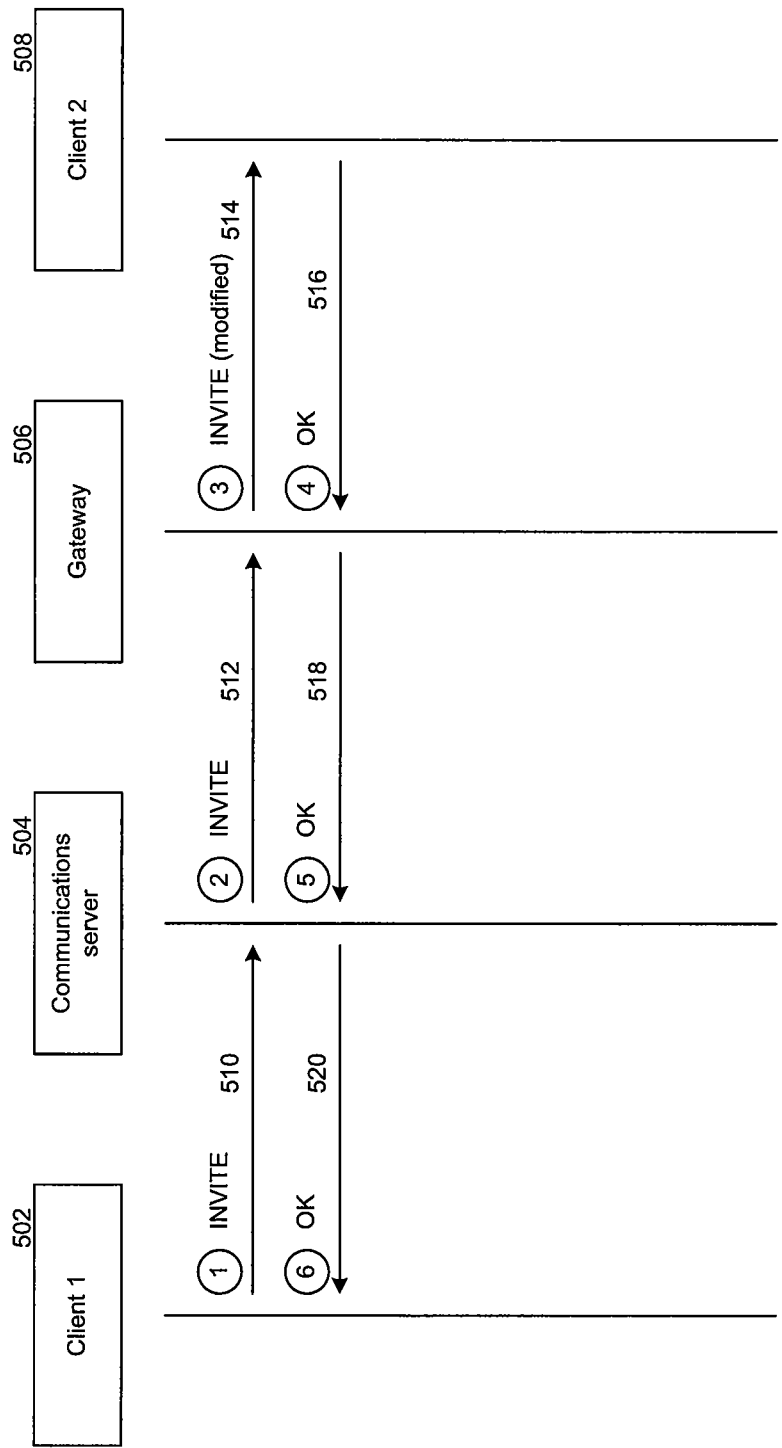

FIGS. 4-5 are message flow diagrams illustrating flows of messages between components of the facility in various embodiments.

FIG. 4 illustrates an embodiment in which an application server 406 identifies information that a client 402 should provide to a user who initiates a conversation. The illustrated embodiment describes SIP messages, though other protocols can be used. When the user initiates a conversation, the client can send a SIP INVITE message 408 to a communications server 404 with which the client is ordinarily configured to communicate. The communications server forwards 410 the INVITE message to the application server.

Upon receiving the INVITE message, the application server can respond with an OK message 412, which it sends to the communications server. The communications server can forward 414 the OK message to the client that originally sent the INVITE message. The application server can also send an INFO message 416 later or concurrently with the OK message. The INFO message can identify information (e.g., data) that the client should provide to the user. As an example, the INFO message can include an indication of the information in its body. The indication can be provided in an extensible markup language ("XML"), text, binary, or in any other form that the client can recognize. The indication can also include various configuration settings that the client can use when rendering the information. As an example, the indication can include a URL of a web page to display and a configuration setting indicating that the web page should close when the conversation ends. The following provides an example of an XML segment that an application server can add to the body of an INFO message:

```
<privateData>
    <private>
        <callAssociatedData>
            <urlToHost>XXX.YYY.ZZZ</urlToHost>
        </callAssociatedData>
    </private>
</privateData>
```

In this example XML segment, the urlToHost element can indicate the URL of a web page that the client should load and display.

In various embodiments, the information that the INFO message indicates can be HTML pages, video, audio, or any media form. The client can display or otherwise render the indicated media, such as by using applications or software components, such as ACTIVEX controls, JAVA applets, script code, and so forth.

The communications server forwards 418 the INFO message to the client. The client can then display or otherwise render the indicated information.

The client can then send an OK message 422 to indicate that it has received the INFO message, which the communications server receives and forwards 424 to the application server.

In some embodiments, the client can then respond to the INFO message by sending a responsive INFO message directed to the application server that sent the INFO message. This INFO message can provide an indication of status, such as whether the indicated information could be retrieved and provided to the user, whether an error occurred, and so forth. In some embodiments, the client can also provide the indication of the information it received (e.g., the URL) so that the application server can coordinate future messages or further activity.

The application server can send additional INFO messages 426 that the communications server receives and forwards 428 to the client. These additional INFO messages may or may not contain indications of information that the client is to display or render. The client can then display or otherwise render any information the INFO messages indicate.

The client may then respond with OK messages 430 that the communications server receives and forwards 432 to the application server.

The client may also request information by sending a REQUEST message 434 that the communications server receives and forwards 436 to the application server. The application server may then send RESPONSE messages 438 containing the requested information or errors, which the communications server receives and forwards 440 to the client.

FIG. 4 illustrates an embodiment in which the application server is an entity that can receive, process, and send messages, such as messages containing information. In this embodiment, the application server can indicate information that the client is to render in INFO messages.

In contrast, FIG. 5 illustrates an embodiment in which a routing agent, such as a gateway computing device, adds an indication of information to messages that transit the routing agent. A first client 502 sends an INVITE message 510 to a communications server 504. The communications server can forward 512 the INVITE message to a routing agent, such as a gateway 506. The routing agent can modify the INVITE message, such as to add an indication of information, and forward the modified INVITE message 514 to a second client. As an example, the routing agent may modify the INVITE message in a manner that is similar to how an application server adds indications of information to INFO messages, as is described above in relation to FIG. 4. The first client can be an initiator of a conversation and the second client can be a participant in the conversation. The initiator can initiate a conversation with several participants.

The second client can respond to the INVITE message with an OK message 516. Upon receiving the OK message from the second client, the routing agent may modify the OK message to include an indication of information and forward the modified OK message 518 to the communications server. The communications server can forward 520 the modified OK message it receives to the first client.

The embodiments illustrated in FIGS. 4 and 5 can also be used in multiparty conversations in which a client initiates a conversation with multiple participants. In such a case, the computing device that adds indications of information to messages can do so in such a manner that multiple recipients can receive such indications.

In various embodiments, other computing devices, such as the communications server or clients, may modify various messages instead of, or in addition to, the routing agent or the application server.

Figure 6A:
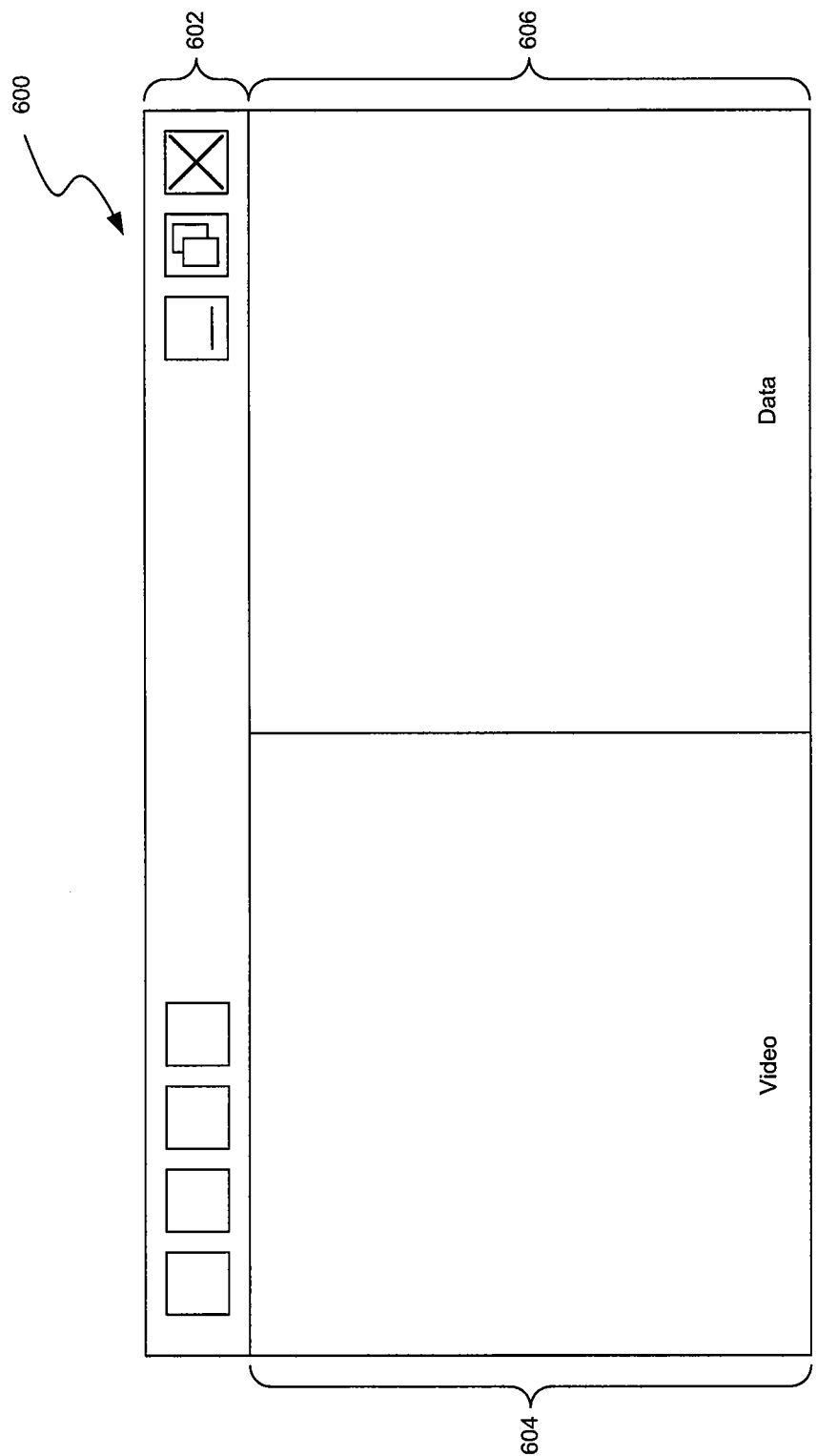
FIGS. 6A-6C are user interface diagrams illustrating aspects of user interfaces associated with the facility in various embodiments.
Figure 6B:
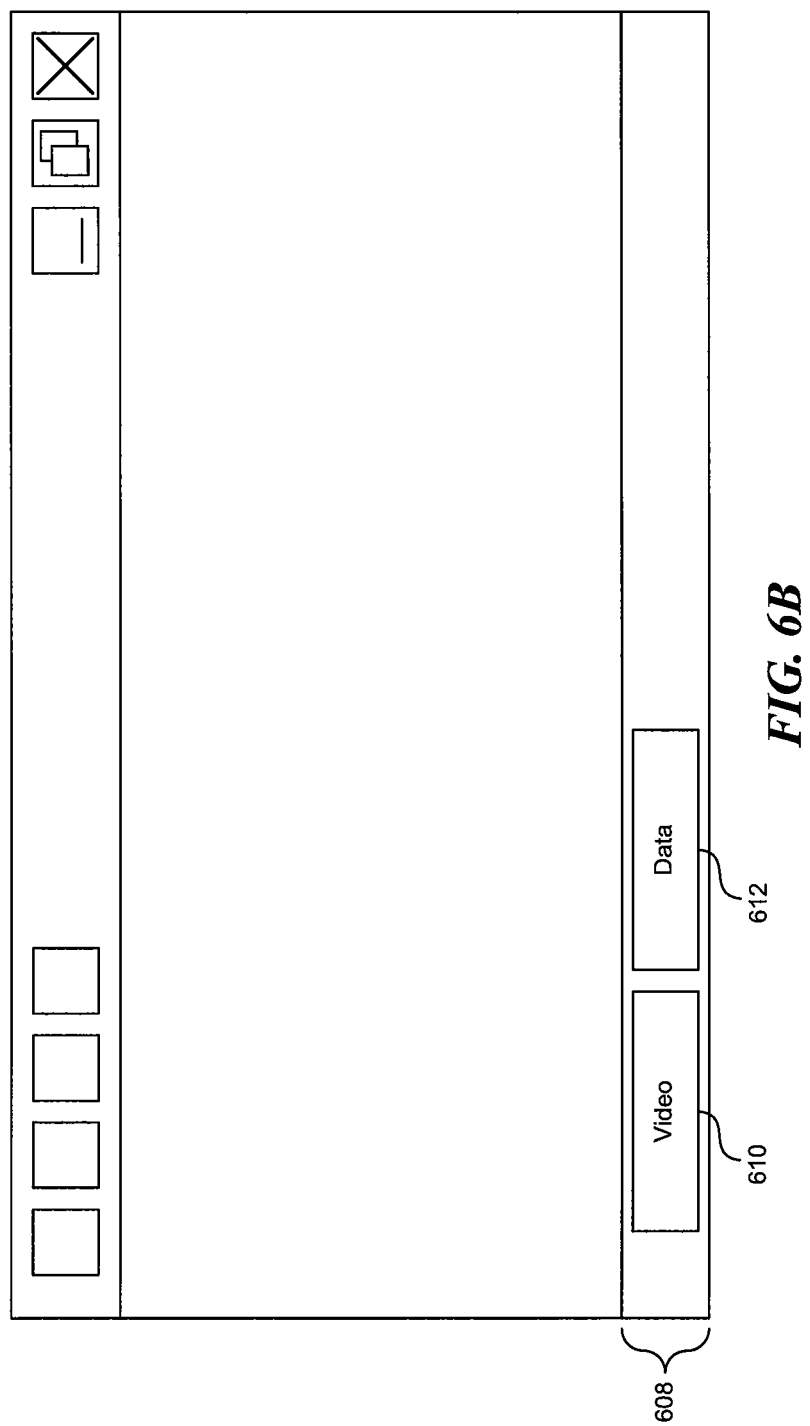
Figure 6C:
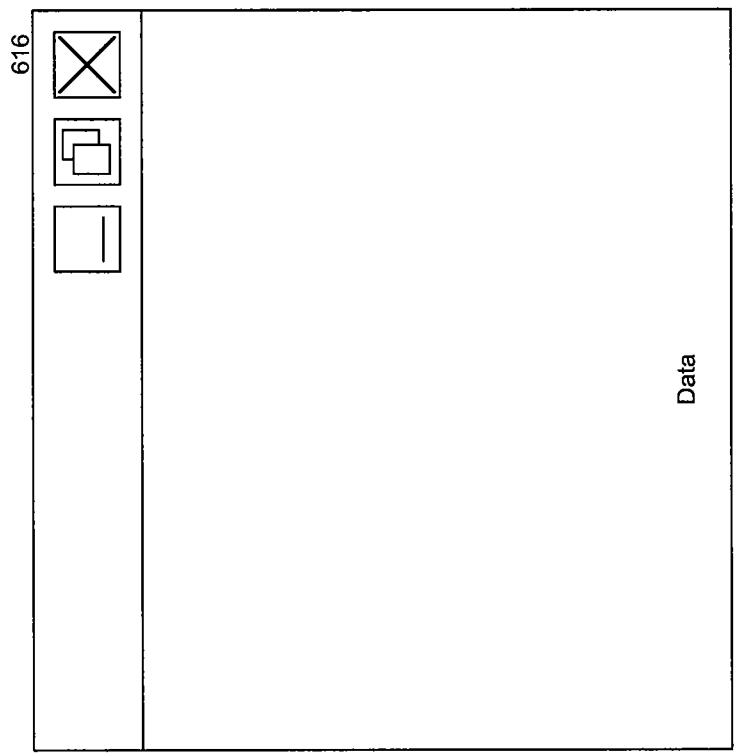
Figure 6C:
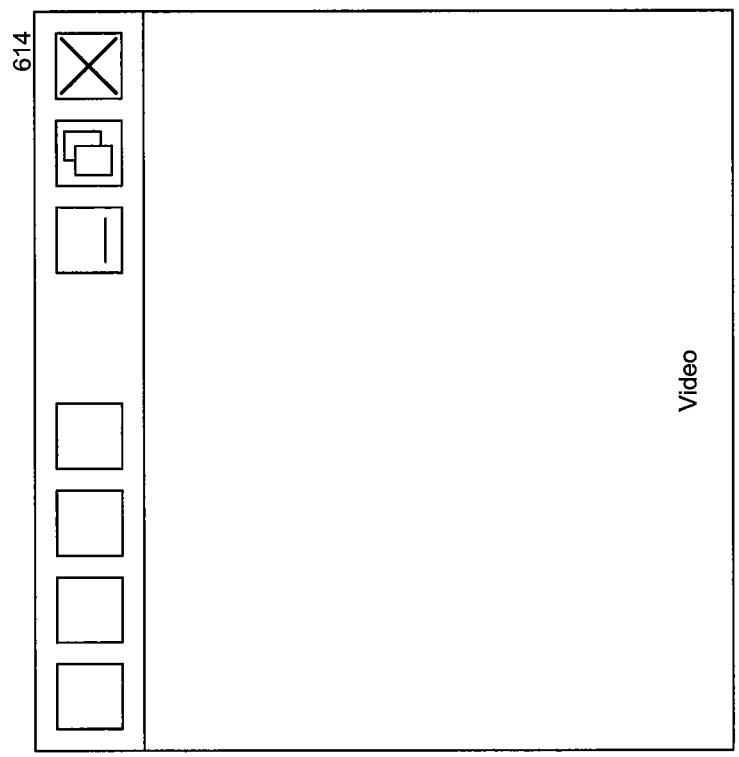

FIGS. 6A-6C are user interface diagrams illustrating aspects of user interfaces associated with the facility in various embodiments.

As is illustrated in FIG. 6A, a communications application associated with a client computing device may display a window 600 when its user is participating in a video conversation. The communications application may display this or other windows when its user participates in conversations using other media forms. The window has a command region 602, video region 604, and data region 606. The command region can include various commands (e.g., as icons or menu options) for manipulating the window, starting or stopping a conversation, and otherwise controlling the conversation.

The communications application can display incoming video from a video conversation within the video region. When an incoming message (e.g., an INFO message) indicates that information is available, the communications application can render the indicated information in the data region. As an example, the communications application can employ an INTERNET EXPLORER object or control in the data region to display web pages that is indicated by a URL included in the message. In various embodiments, the communications application uses other controls or objects, as appropriate, to render information indicated by the messages.

The window illustrated in FIG. 6B is similar to the window illustrated in FIG. 6A, except that the video and data regions are separated into tabbed regions. A user can select a region for display by identifying the desired region in a tab region 608. As an example, selecting a video tab 610 displays the video region. Selecting a data tab 612 displays the data region.

The windows illustrated in FIG. 6C are similar to the window illustrated in FIG. 6A, except that the video and data regions are separated into two separate windows. Users may be able to manipulate each of these windows individually.

While various user interfaces are illustrated, other user interfaces are also possible. As an example, the user interfaces may be included in another application, such as an INTERNET EXPLORER, customer services application, and so forth.

Figure 7:
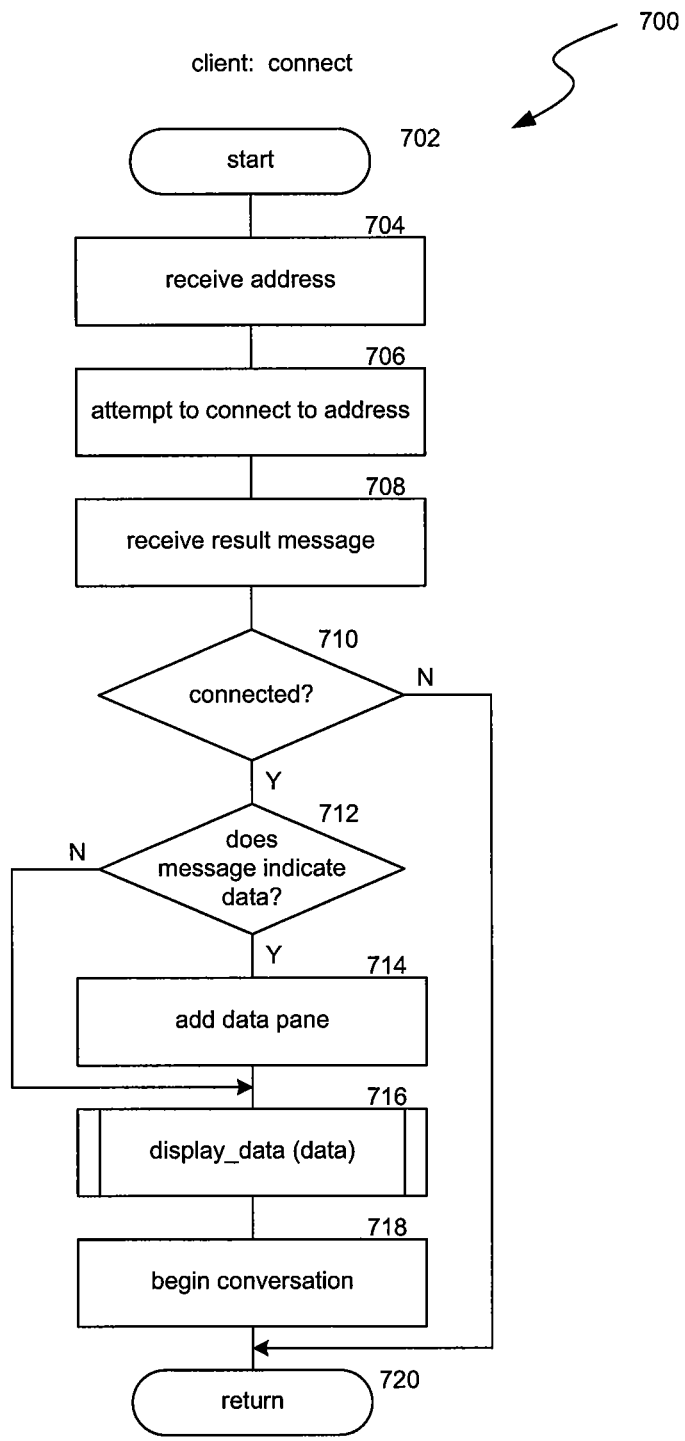
FIG. 7 is a flow diagram illustrating a connect routine invoked by the facility in various embodiments.

FIGS. 7-10 are flow diagrams illustrating various routines the facility invokes. FIG. 7 is a flow diagram illustrating a connect routine invoked by the facility in various embodiments. A client application can invoke the connect routine 700 when a user commands the client application to connect with another computing device, such as an application server or another client computing device. The routine begins at block 702.

At block 704, the routine receives an address. As an example, the routine may receive a telephone number, IP address, or other indication of the computing device with which the user desires to begin a conversation.

At block 706, the routine attempts to connect to the indicated address. As an example, the routine may cause a SIP INVITE message to be sent to the indicated address. Initiators of conversations send SIP INVITE messages to attempt to connect to other computing devices. Alternatively, the routine may attempt to place a VoIP call to the indicated address.

At block 708, the routine receives a result message. As an example, the routine may receive a message from the computing device located at the address to which the message was sent at block 706.

At decision block 710, the routine determines whether it has connected to the address. As an example, the routine may make this determination based on the result message it received at block 708. When using SIP, the routine may receive an OK message. When the routine determines that it is connected, the routine continues at block 712. Otherwise, the routine continues at block 720, where it returns.

At decision block 712, the routine determines whether the message it received at block 708 indicates data. As an example, a SIP INFO message that indicates a URL at which information is available is determined by the routine to indicate data. When this is the case, the routine continues at block 714. Otherwise, the routine continues at block 718.

At block 714, the routine adds a data pane (e.g., data region) to the communications application. In various embodiments, the routine may display a data region in a conversation window, another window, or other location at which the information can be provided to the user.

At block 716, the routine invokes a display_data subroutine. In various embodiments, the routine may provide to the display_data subroutine an indication of the location from which the data can be retrieved. As an example, the routine may provide the URL it received in the result message. The display_data subroutine is described in further detail below in relation to FIG. 8.

At block 718, the routine begins the conversation. As an example, the routine, having established a connection, may enable the user to type text, speak, send video images, and so forth. The input the user provides may then be forwarded to the computing device whose address was indicated at block 704.

At block 720, the routine returns.

Figure 8:
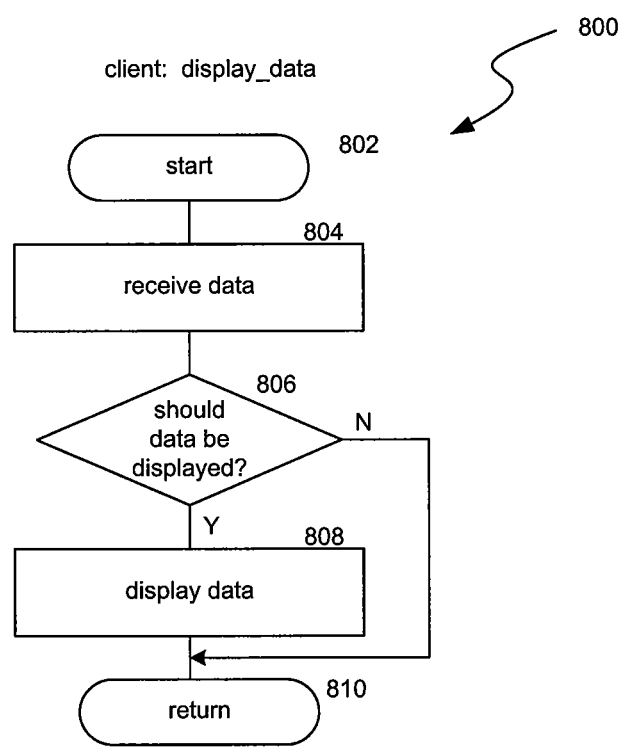
FIG. 8 is a flow diagram illustrating a display_data routine invoked by the facility in various embodiments.

FIG. 8 is a flow diagram illustrating a display_data routine invoked by the facility in various embodiments. The client communications application can invoke the display_data routine 800 to display information that is indicated in a message that the client receives, such as from an application server or other computing device. The routine begins at block 802.

At block 804, the routine receives an indication of the location from which the data is to be retrieved. As an example, the routine receives a URL from which a web page can be retrieved.

At decision block 806, the routine determines whether the data should be displayed. As an example, the routine may determine that a URL identifying a web page located on an intranet or at a secured Internet site can be displayed, but other web pages cannot be displayed. If the data can be displayed, the routine continues at block 808. Otherwise, the routine continues at block 810, where it returns.

At block 808, the routine retrieves and displays the data. In various embodiments, the routine may retrieve and render other information, such as audio, video, or any other type of media.

At block 810, the routine returns.

Figure 9:
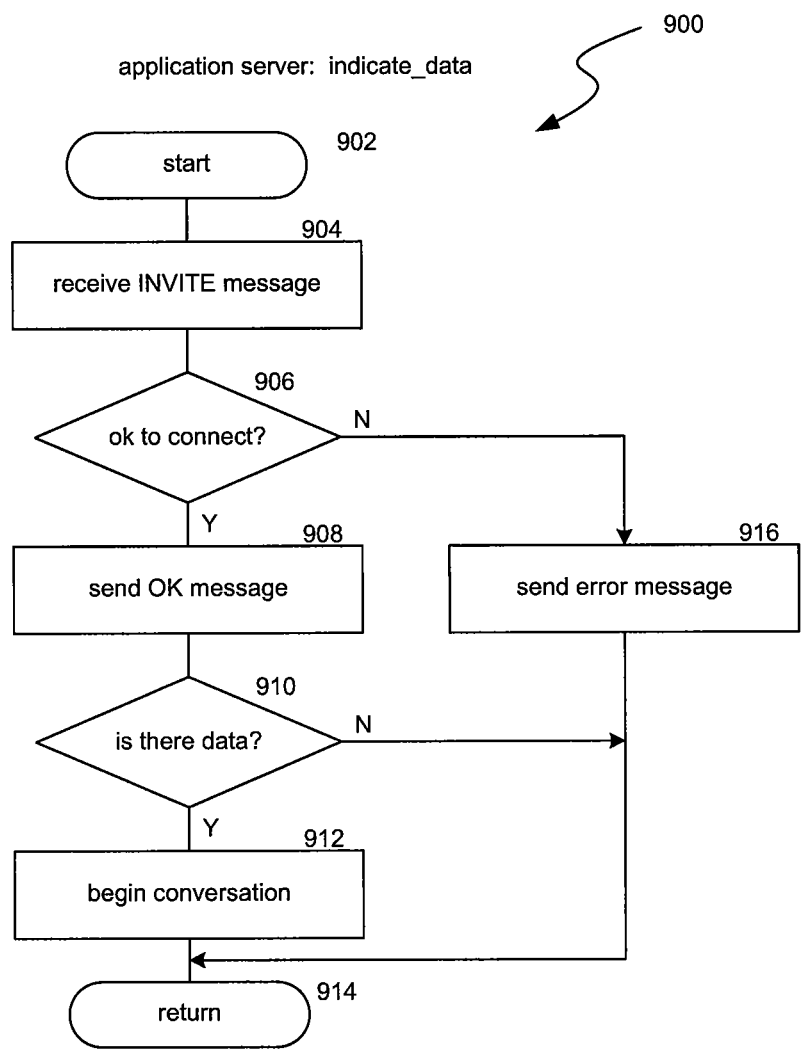
FIG. 9 is a flow diagram illustrating an indicate_data routine invoked by an application server component associated with the facility in various embodiments.

FIG. 9 is a flow diagram illustrating an indicate_data routine invoked by an application server associated with the facility in various embodiments. An application server may invoke the routine 900 to indicate to a client that data is available in relation to a conversation. The routine begins at block 902.

At block 904, the routine receives an INVITE message. As an example, the routine may receive the INVITE message when a client initiates a conversation with the application server.

At decision block 906, the routine determines whether the client is authorized to connect to the application server. As an example, the routine may determine whether a user who is initiating the conversation is authorized to initiate the conversation, such as by checking an access control list. If the client is authorized to initiate a conversation, the routine continues at block 908. Otherwise, the routine continues at block 916.

At block 908, the routine sends a response message to the client that initiates the conversation. As an example, the routine sends an OK message to the client.

At decision block 910, the routine determines whether there is any data to be provided to the client in relation to the conversation. As an example, the routine may check a database, evaluate logic, and so forth, based on attributes of the client; the user who initiates the conversation, and so forth. If there is data associated with the conversation, the routine continues at block 912. Otherwise, the routine continues at block 914, where it returns.

At block 912, the routine creates and sends an INFO message with the data to the client. As an example, the routine may include a URL in the INFO message so that the client can retrieve information located at the URL.

In various embodiments, when there is no data associated with the conversation, the routine may send an INFO message without indicating any data (not illustrated).

At block 916, the routine sends an error message to the client. As an example, the routine may indicate that the client is unauthorized to initiate a conversation with the application server. The routine then continues at block 914.

At block 914, the routine returns.

Figure 10:
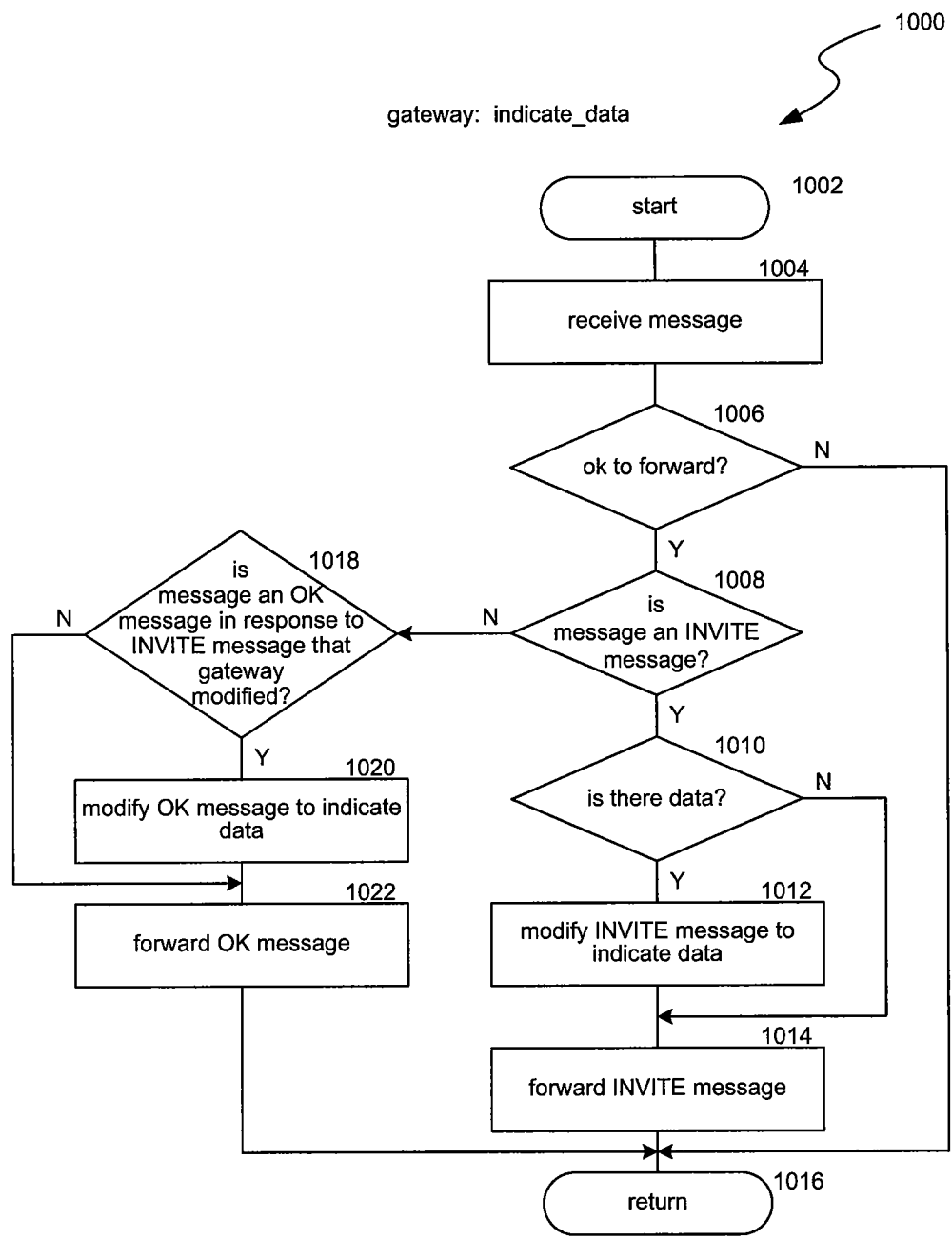
FIG. 10 is a flow diagram illustrating an indicate_data routine invoked by a gateway component associated with the facility in various embodiments.

FIG. 10 is a flow diagram illustrating an indicate_data routine invoked by a gateway component associated with the facility in various embodiments. A routing agent, such as a gateway, may invoke the routine 1000 to indicate data. The routine begins at block 1002.

At block 1004, the routine receives a message. As an example, the routine may receive a message from a client, communications server, or other device.

At decision block 1006, the routine determines whether the received message should be forwarded. As an example, the routine may determine whether a user who initiated the conversation is authorized to initiate a conversation. Alternatively, the routine may determine whether a destination for the message, such as a computing device, is authorized to receive the conversation initiation message. If it is okay to forward the message, the routine continues at block 1008. Otherwise, the routine continues as block 1016, where it returns.

At decision block 1008, the routine determines whether the received message is an INVITE message. If the message is an INVITE message, the routine continues at block 1010. Otherwise, the routine continues at block 1018.

At decision block 1010, the routine determines whether there is any data associated with the conversation. As an example, the routine may make this determination by retrieving information from a database, evaluating logic, and so forth. If there is data associated with the conversation, the routine continues at block 1012. Otherwise, the routine continues at block 1014.

At block 1012, the routine modifies the received INVITE message to indicate that data is available. As an example, the routine may place a URL in the body of the INVITE message that it received.

At block 1014, the routine forwards the INVITE message. As an example, the routine forwards the message that it modified at block 1012. The routine then continues at block 1016, where it returns.

At decision block 1018, the routine determines whether the message is an OK message that it received in response to an INVITE message that the routing agent (e.g., gateway) previously modified, such as to indicate data. If the message is an OK message that it received in response to a modified INVITE message, the routine continues at block 1020. Otherwise, the routine continues at block 1022.

At block 1020, the routine modifies the OK message to indicate that data is available. As an example, the routine may add a URL in a body section of the OK message.

At block 1022, the routine forwards the OK message. As an example, the routine forwards the OK message that it modified at block 1020.

The routine then continues at block 1016, where it returns.

Those skilled in the art will appreciate that the logic illustrated in FIGS. 7-10 and described above may be altered in a variety of ways. For example, the order may be rearranged, substeps may be performed in parallel, shown logic may be omitted, or other logic may be included, etc.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

We claim:

1. A method performed by a computing system for integrating data in a conversation, comprising:
    sending by a computing device executing a voice communication application an invitation message to a responding computing device to begin a voice conversation via Voice Over Internet Protocol (VoIP);
    starting the conversation;
    within a subsequent message received by the computing device from the responding computing device as part of the voice conversation via VoIP, receiving a uniform resource locator (URL) to be associated with the voice conversation;
    under control of the voice communication application, opening a window and displaying within the opened window a web page associated with the URL;
    receiving, from a user using the computing device, a request to connect with a human operator;
    transmitting by the communication application the previously received URL and an indication of a portion of the web page to the responding computing device so that the responding computing device can identify the URL and the portion of the web page viewed by the user at the computing device to the human operator.

2. The method of claim 1, wherein the responding computing device provides an interactive voice response (IVR) application.

3. The method of claim 2, wherein the URL identifies a resource that provides details pertaining to a selection made by the user via the IVR application.

4. A computer-readable memory storing computer-executable instructions that, if executed, perform operations comprising:
    sending by a computing device executing a voice communication application an invitation message to a responding computing device to begin a voice conversation via Voice Over Internet Protocol (VoIP);
    starting the conversation;
    within a subsequent message received by the computing device from the responding computing device as part of the voice conversation via VoIP, receiving a uniform resource locator (URL) to be associated with the voice conversation;

under control of the voice communication application, opening a window and displaying within the opened window a web page associated with the URL;

receiving, from a user using the computing device, a request to connect with a human operator;

transmitting by the communication application the previously received URL and an indication of a portion of the web page to the responding computing device so that the responding computing device can identify the URL and the portion of the web page viewed by the user at the computing device to the human operator.

5. A system, comprising:

one or more processors and memories;

a component, executing at a computing device executing a voice communication application, configured to send an invitation message to a responding computing device to begin a voice conversation via Voice Over Internet Protocol (VoIP);

a component configured to start the conversation;

a component configured to, within a subsequent message received by the computing device from the responding computing device as part of the voice conversation via VoIP, receive a uniform resource locator (URL) to be associated with the voice conversation;

a component configured to, under control of the voice communication application, open a window and displaying within the opened window a web page associated with the URL;

a component configured to receive, from a user using the computing device, a request to connect with a human operator;

wherein the communication application is configured to transmit the previously received URL and an indication of a portion of the web page to the responding computing device so that the responding computing device can identify the URL and the portion of the web page viewed by the user at the computing device to the human operator.

* * * * *